US012340707B2

(12) United States Patent
Savarit et al.

(10) Patent No.: US 12,340,707 B2
(45) Date of Patent: Jun. 24, 2025

(54) METHOD FOR VALIDATING A TERRAIN DATABASE

(71) Applicant: THALES, Courbevoie (FR)

(72) Inventors: Vincent Savarit, Toulouse (FR); Stéphane Fleury, Toulouse (FR); Betty Bastareaud, Toulouse (FR)

(73) Assignee: THALES, Courbevoie (FR)

( * ) Notice: Subject to any disclaimer, the term of this patent is extended or adjusted under 35 U.S.C. 154(b) by 279 days.

(21) Appl. No.: 17/849,298

(22) Filed: Jun. 24, 2022

(65) Prior Publication Data

US 2023/0026962 A1 Jan. 26, 2023

(30) Foreign Application Priority Data

Jun. 24, 2021 (FR) ....................................... 2106731

(51) Int. Cl.

| | |
|---|---|
| ***G08G 5/74*** | (2025.01) |
| ***G08G 5/21*** | (2025.01) |
| ***G08G 5/30*** | (2025.01) |
| ***G08G 5/55*** | (2025.01) |
| ***G08G 5/59*** | (2025.01) |
| ***G08G 5/80*** | (2025.01) |

(52) U.S. Cl.

CPC ................. *G08G 5/74* (2025.01); *G08G 5/21* (2025.01); *G08G 5/30* (2025.01); *G08G 5/55* (2025.01); *G08G 5/59* (2025.01); *G08G 5/80* (2025.01)

(58) Field of Classification Search

CPC .... G08G 5/0086; G08G 5/0021; G08G 5/003; G08G 5/006; G08G 5/045

See application file for complete search history.

(56) References Cited

U.S. PATENT DOCUMENTS 6,092,009 A * 7/2000 Glover ................. G05D 1/0676 701/14
6,233,522 B1 * 5/2001 Morici ................. G01C 21/005 701/493
7,440,591 B1 * 10/2008 McCusker ............. G06V 20/13 434/150
7,668,628 B1 * 2/2010 Carrico ................ G01C 23/005 340/963
7,859,449 B1 * 12/2010 Woodell ................ G01S 13/935 342/26 B
9,262,932 B1 2/2016 Barber et al.
10,562,643 B1 2/2020 Strabala et al.
2003/0107499 A1 * 6/2003 Lepere ................. G05D 1/0653 340/945

(Continued)

OTHER PUBLICATIONS

Xiao, et al., "Research on an EGPWS/TAWS Simulator with Forward-looking Alerting Function", 2014 IEEE/AIAA 33rd Digital Avionics Systems Conference (DASC), 2014.

*Primary Examiner* — Donald J Wallace
*Assistant Examiner* — Jalal C Coduroglu
(74) *Attorney, Agent, or Firm* — BakerHostetler

(57) ABSTRACT

A method for validating a terrain database includes a step of simulating flights based on trajectory data for an aircraft, the flight simulations being speeded up, a step of determining terrain collision risks by means of a system for signalling terrain collision risks based on the speeded-up flight simulations, a step of determining the origins of terrain collision risks with a view to validating or not validating the terrain database.

8 Claims, 4 Drawing Sheets

(56) References Cited

U.S. PATENT DOCUMENTS

| | | | | |
|---|---|---|---|---|
| 2003/0222795 | A1* | 12/2003 | Holforty | B64D 43/00 340/968 |
| 2006/0074559 | A1* | 4/2006 | Meunier | G01C 5/005 701/9 |
| 2007/0171094 | A1 | 7/2007 | Alter et al. | |
| 2008/0306639 | A1* | 12/2008 | Fleury | G08G 5/0078 701/8 |
| 2009/0132103 | A1* | 5/2009 | Marty | G05D 1/106 701/3 |
| 2012/0158219 | A1* | 6/2012 | Durling | G08G 5/045 701/4 |
| 2019/0054937 | A1* | 2/2019 | Graetz | G08G 5/0039 |
| 2019/0096271 | A1* | 3/2019 | Chandrashekarappa | H04N 5/00 |
| 2020/0250999 | A1* | 8/2020 | Sawhill | G08G 5/0039 |
| 2020/0326729 | A1* | 10/2020 | Ham | G05D 1/106 |
| 2023/0195712 | A1* | 6/2023 | Carpentier | G06F 16/23 707/609 |

* cited by examiner

METHOD FOR VALIDATING A TERRAIN DATABASE

CROSS-REFERENCE TO RELATED APPLICATION

This application claims priority to foreign French patent application No. FR 2106731, filed on Jun. 24, 2021, the disclosure of which is incorporated by reference in its entirety.

FIELD OF THE INVENTION

The field of the present invention is that of systems for managing and monitoring the flight of an aircraft and more particularly of a flight management system (FMS) and of an onboard terrain awareness and warning system (TAWS).

BACKGROUND

It is known practice to use a flight management system (FMS) in an aircraft. Such a system allows aircraft trajectories and flight plans to be computed and suitable guide instructions to be supplied to the pilot or autopilot to follow the computed trajectory. In the field of air navigation, an aircraft trajectory comprises a horizontal dimension and a vertical dimension. The skeleton outline of the horizontal trajectory of an aircraft is called the route and it consists of a sequence of flight plan points joined by segments. Each of these segments is defined between two waypoints, the final waypoint of a segment also forming the initial waypoint of the next segment of the route. These waypoints may, for example, be defined by the location of radio navigation beacons, or by geographical coordinates.

The FMS system computes an optimized trajectory based on various criteria such as fuel consumption, passenger comfort, precision with respect to aircraft performance, etc. This trajectory, although in accordance with the general flight management procedure, may nonetheless vary significantly depending on aircraft configuration or the current weather. This is why the aircraft is monitored in real time in relation to its environment and in particular with respect to terrain conflicts. Such monitoring is performed by a terrain awareness and warning system (TAWS). This TAWS is designed to be installed on board aircraft with a view to preventing air accidents, such as collisions with the ground or with high terrain. Accidents of this type, known in the technical literature as CFITs for “controlled flights into terrain”, made up a substantial proportion of air disasters in the past. Collisions with terrain are now prevented by virtue of terrain avoidance manoeuvres performed by the crew when prompted by warnings and alarms from the TAWS.

To perform its task of monitoring the aircraft in relation to the terrain, the TAWS relies on a terrain database. As such, the generation of warnings and alarms is highly dependent on the quality of this terrain database. However, currently, the terrain database is obtained by aggregating many heterogeneous sources. Artefacts, such as invisible mountains in the middle of the ocean, may then appear and consequently lead to false alarms in operation. To prevent these false alarms, it is known practice to carry out a manual engineering review and a limited series of tests to ensure a minimum level of quality for the terrain database. Attention is then drawn to strongly delta regions but since the bulk of information and modifications is so great it is difficult to be exhaustive.

There is therefore a need to ensure a maximum level of integrity before a new terrain database is brought into service or before the implementation of new updates in this terrain database.

SUMMARY OF THE INVENTION

The present invention aims to at least partially rectify this need.

More particularly, the aim of the present invention is to validate the content of a terrain database.

To that end, a first subject of the invention is a method for validating a terrain database, said terrain database comprising a plurality of items of information on at least one geographical region liable to be flown over by an aircraft, said validating method comprising steps implemented by computing means such as: a step of generating data on trajectories of the aircraft over the geographical region; a step of simulating flights based on said trajectory data, said flight simulations being speeded up; a step of determining terrain collision risks by means of a system for signalling terrain collision risks based on the speeded-up flight simulations; a step of determining the origins of terrain collision risks with a view to validating or not validating the terrain database.

Conventionally, the signalling system is installed in an aircraft in order to determine collision risks. These collision risks are identified in flight and the future evolution of these risks is analysed over a short time period. It is an “immediate real-time” warning. Errors in the issuing of these collision risks, for example due to the presence of an artefact, may be disruptive for the aircraft’s pilot. In the invention, potential errors are determined prior to the aircraft’s flight by validating the terrain database. A plurality of possible trajectories of the aircraft over the geographical regions covered by the terrain database are thus determined. These trajectories are then speeded up so as not to have to run through the entire flight at normal speed, in view of the number of flights that that represents, and are then processed to determine the origins of collision risks flagged by a system for signalling terrain collision risks located on the ground, i.e. not on board an aircraft. Accelerated trajectory” means a trajectory sampling of 60 ms or more.

In one particular embodiment, the trajectory data are instantaneous aircraft vectors.

In one particular embodiment, the instantaneous aircraft vectors are obtained by sampling trajectories $FMS_{traj}$ generated by a flight management system.

In one particular embodiment, the FMS trajectories are generated based on a plurality of scenarios, said scenarios Sri being based on at least one parameter belonging to a set of parameters comprising at least: a mass of the aircraft; a wind strength; a climb rate of the aircraft; a descent rate of the aircraft; a takeoff temperature; a landing temperature; a cruising speed of the aircraft; a cruising altitude of the aircraft.

In one particular embodiment, the scenarios are generated based on operational routes, said operational routes using previously extracted departure procedures and arrival procedures.

In one particular embodiment, the departure procedures and the arrival procedures are extracted from a navigation database.

Another subject of the invention is a device for validating a terrain database, said terrain database comprising a plurality of items of information on at least one geographical region liable to be flown over by an aircraft. The validating device comprises a module for generating data on trajectories of the aircraft over the geographical region; a flight simulator based on said trajectory data, said flight simulations being speeded up; a system for signalling terrain collision risks to determine terrain collision risks based on the speeded-up flight simulations; a module for determining the origin of terrain collision risks with a view to validating or not validating the terrain database.

Another subject of the invention is a computer program product comprising instructions suitable for executing the steps of a validating method according to the preceding method that is a subject of the invention.

Another subject of the invention is a system for signalling terrain collision risks intended to be installed on board an aircraft, said onboard signalling system being able to warn a crew of said aircraft of a terrain collision risk in a geographical region flown over by said aircraft, said onboard signalling system comprising all or part of a terrain database, said terrain database having been previously validated by the validating method according to the preceding method that is a subject of the invention.

Another subject of the invention is an aircraft comprising an onboard system for signalling terrain collision risks according to the preceding system that is a subject of the invention.

BRIEF DESCRIPTION OF THE DRAWINGS

The present invention will be better understood upon reading the detailed description of embodiments, taken by way of completely non-limiting example and illustrated by the appended drawings, in which.

DETAILED DESCRIPTION

The invention is not limited to the embodiments and variants that are presented, and other embodiments and variants will be readily apparent to those skilled in the art.

Figure 2:
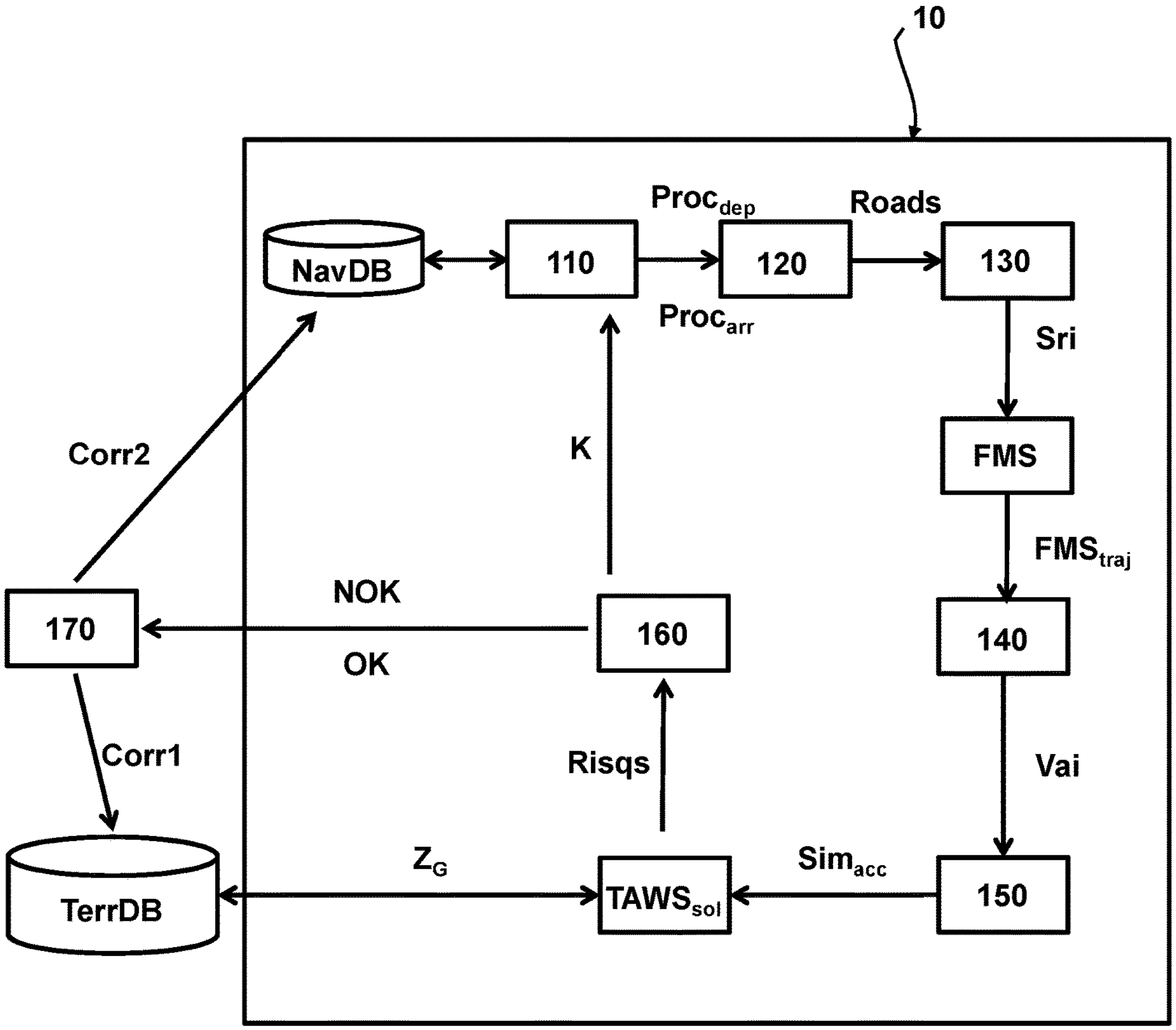
FIG. 2 illustrates a device for validating a terrain database according to the invention.

FIG. 2 illustrates, according to the invention, a device for validating a terrain database TerrDB according to the invention.

The terrain database TerrDB is a database grouping together all of the topographical information on one or more geographical regions covered by said database. This database is obtained by aggregating many heterogeneous sources, such as civil sources or military sources.

The device for validating the terrain database TerrDB comprises:

a navigation database NavDB, a procedure extraction module 110;

a route set generator 120;

a scenario Sri generator 130;

an FMS system;

an instantaneous aircraft vector generator 140;

a flight simulator 150;

a ground-based TAWS $TAWS_{sol}$;

a module 160 for determining risk origin.

The navigation database NavDB is a database comprising all of the departure procedures and all of the arrival procedures covering all airports worldwide. This requires that the concatenation rules dictated by the A424 standard be observed. Conventionally, a departure procedure is composed of a runway, followed by a SID (standard instrument departure), followed by a SID_TRANS. Inversely, an arrival procedure is composed of a STAR_TRANS, followed by a STAR (standard terminal arrival route), followed by a VIA, followed lastly by an APPR (for precision approach). Not all runways at an airport are compatible with all SIDs which are in turn not all compatible with all SIS_TRANSs. The same applies for arrival procedures. Still, this restrictive combination reaches a limit of around 60 000 departure combinations and 300 000 arrival combinations for a current database. The combination of departure procedures and arrival procedures results in a number of combinations of at least 18 billion. Of course, this maximum combination is heavily dependent on the flight capabilities of the aircraft in question. By considering the maximum operational capability range of the aircraft, it is possible to reduce this combination. The navigation database NavDB is a shared database. It is updated monthly.

Figure 1:
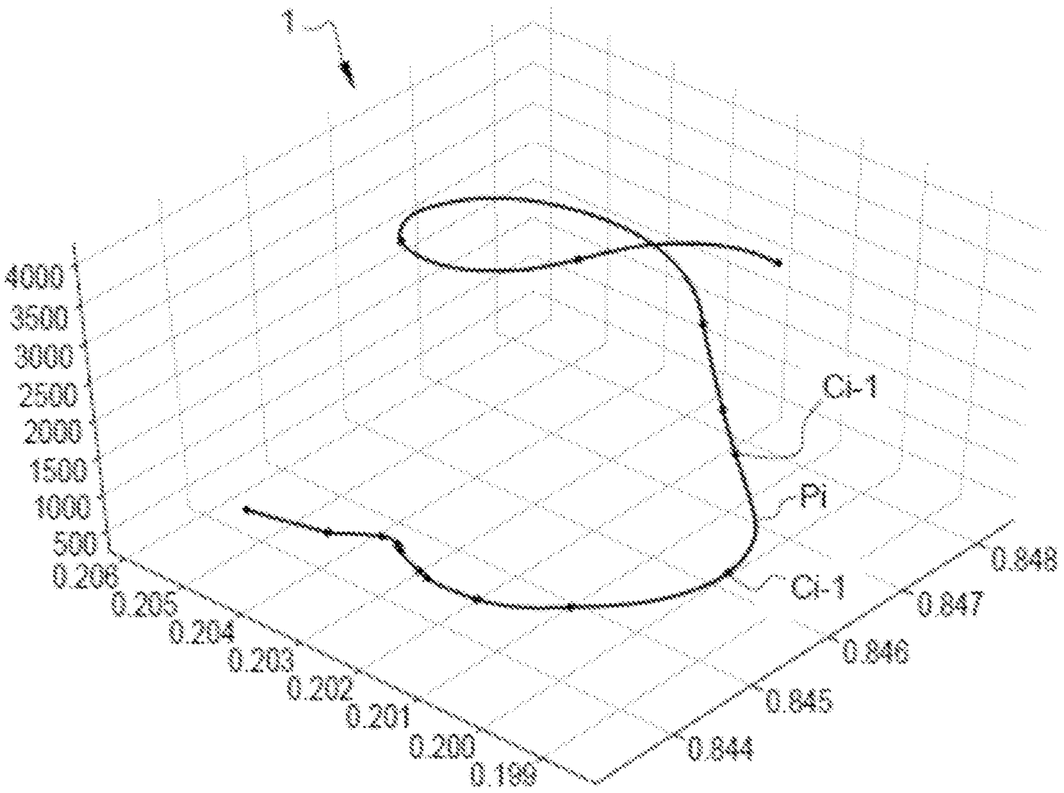
FIG. 1 illustrates an example of samples of points characterizing an arrival procedure according to the prior art.

By way of example, FIG. 1 illustrates an arrival procedure 1. This comprises a set of trajectory portions Pi, each trajectory portion Pi running between two waypoints Ci-1, Ci. For this, each waypoint Ci-1, Ci is defined in a three-dimensional space.

The procedure extraction module 110 is designed to extract from the navigation database NavDB the departure procedures $Proc_{dep}$ and the arrival procedures $Proc_{arr}$ associated with the geographical regions $Z_G$ covered by the terrain database TerrDB.

The route set generator 120 is designed to generate operational routes Roads based on the extracted departure procedures $Proc_{dep}$ and arrival procedures $Proc_{arr}$. This route set is generated in relation to the capability range of the aircraft in question allowing all of the extracted procedures to be covered while using available airways to link the end of a departure procedure to the beginning of an arrival procedure. Aviation regulations define airways in order to manage aircraft spacing. Each airway is defined by a given altitude and a given direction (some may be two-way). Seeking to produce the total combination "every procedure $Proc_{dep}$"×"all arrival procedures $Proc_{arr}$"×"all airways" would not be achievable unless supercomputers were used and would not be of validation interest anyway. It is sought here to cover each departure procedure $Proc_{dep}$ and each arrival procedure $Proc_{arr}$ once by selecting each time a pair spaced apart by a distance consistent with the type of aircraft in question and linking them using available airways constructed using a conventional pathfinding algorithm (for example the A* algorithm).

The scenario Sri generator 130 is designed to generate scenarios based on operational routes Roads. These scenarios are based on at least one parameter belonging to a set of parameters comprising at least:

a mass of the aircraft;

a wind strength;

a climb rate of the aircraft;

a descent rate of the aircraft;

a takeoff temperature;

a landing temperature;

a cruising speed of the aircraft;

a cruising altitude of the aircraft.

On this list, some parameters are directly linked to the operational capability range of the aircraft. By way of example, it is possible to produce a scenario of "low mass, high climb rate, without wind or temperature deviation on takeoff". Another exemplary scenario might be "high mass, low climb rate, strong descent wind on arrival". The idea is not to cover the entire operational capability range of the aircraft but rather to construct limit scenarios in order to compute "corridor" trajectories. The idea is also to conduct a large, but still reasonable, number of tests and therefore limit combinations while still retaining a high level of trustworthiness with regard to the relevance of the results.

The FMS is designed to compute an associated trajectory $FMS_{traj}$ for each of the scenarios. This trajectory $FMS_{traj}$ is multidimensional, with the main dimensions being latitude, longitude, altitude and speed. It is therefore necessary to inject the entirety of the scenario (departure procedure, list of airways, arrival procedure, masses, winds, etc.) into the FMS. It will then be able to compute a complete trajectory. The trajectories $FMS_{traj}$ are continuous and stable, in particular in their behaviour. Thus, with constant parameters, a trajectory $FMS_{traj}$ computed with medium mass will be situated between a low-mass trajectory and a high-mass trajectory. The most dimension-determining parameters to be varied are therefore: the mass, the climb/descent rate, the wind, the temperature on takeoff/landing, the speed and the cruising altitude.

In one preferred embodiment, the FMS is certified to the DAL B (Design Assurance Level B) standard. Such an FMS may benefit from "open" capabilities allowing communication and interactions with the outside, for example with a computing cloud, with a view to improving data processing.

The instantaneous aircraft vector generator 140 is designed to finely sample each of the trajectories $FMS_{traj}$ generated previously by time interval or distance in order to obtain an "instantaneous aircraft vector" therefrom. It is thus possible to reconstruct a trajectory with N dimensions, N being the number of parameters of the computed aircraft vector. Since each trajectory $FMS_{traj}$ is computed along distinct axes, on the one hand there is the lateral "ground" trajectory of the aircraft and on the other hand its extended vertical trajectory (altitude, speed, mass, etc.). These two aspects must therefore be combined and then divided according to a set pitch in order to simulate the "sliding vector" aspect.

The flight simulator 150 is designed to simulate flights based on instantaneous aircraft vectors. The flight simulator 150 carries out this simulation speeded up so as to limit the computing capacity required for this simulation. For example, instead of taking a real flight point sample every 5 ms, points are processed every 60 ms, which allows the processing speed to be accelerated. For the speeded-up simulation, the sampling is constant here.

In one preferred embodiment, it is possible to improve the simulation through "massive testing" or distributing computing via cloud.

The ground-based TAWS $TAWS_{sol}$ is designed to signal terrain collision risks Risqs based on the flight simulations.

The module 160 for determining the origin of terrain collision risks is designed to store and process the terrain collision risks with a view to determining the cause thereof. For this, the terrain collision risks are grouped together by type and by airport. Specifically, if an error that is the cause of a collision risk is present in a specific geographical region, there is a high probability that the majority of procedures in this geographical region result in a collision risk. It is possible to loop back as many times as necessary by sending a command K to the procedure extraction module 110. This command K contains a list of the geographical regions on which the analysis will be performed. This list may vary between two successive loops.

If, after multiple successive loops, it is determined that the cause of the collision risk originates in the terrain database TerrDB and that this cause is an error, then a non-validation message NOK is transmitted to a control module 170. This control module 170 is designed to deactivate the terrain database TerrDB and/or to send a correction request Corr1 to said database. If it is determined that the cause of the risk is not an error or that this cause does not originate in the terrain database TerrDB, a validation message OK is then transmitted to the control module 170 and the terrain database TerrDB is validated. It will be noted that in this case the control module 170 may transmit a correction request Corr2 to the navigation database NavDB if it is the cause of the error. In one preferred embodiment, control by the control module 170 is automated. It is thus possible to validate "erroneous" trajectories with a system other than the TAWS simply by verifying the altitude at each point with respect to the terrain database TerrDB or another external source. In the case that the warning is justified with respect to the aircraft's performance (it is possible for the procedure to be in accordance but the aircraft's configuration to be unsuitable for the procedure) then it would be appropriate to envisage providing an airline with a list of procedures to which particular attention should be paid by the pilot if they select one of them.

The terrain database TerrDB may then be transmitted partially or entirely to a system 20 for signalling terrain collision risks installed on board an aircraft 200.

Figure 4:
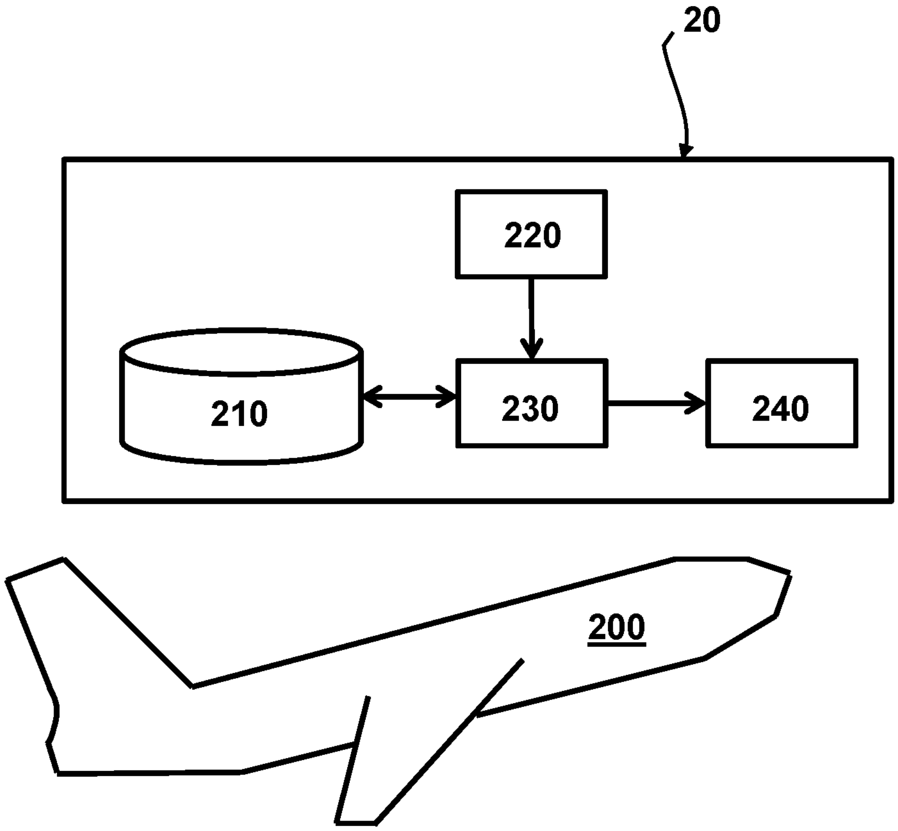
FIG. 4 illustrates an onboard system for signalling terrain collision risks comprising all or part of a terrain database validated according to the validating method of FIG. 3.

Such a system 20 is, more particularly, illustrated in FIG. 4. It comprises:

a database 210;

flight equipment 220;

a computer 230;

a warning generator 240.

The database 210 is part of the terrain database TerrDB validated by the validating device of FIG. 2. This part of the database specifically covers those geographical regions which will be flown over by the aircraft 200.

The flight equipment 220 is designed to determine the main flight parameters including the position of the aircraft in terms of latitude, longitude and altitude, and direction, and the modulus of the aircraft's speed vector. These data are transmitted to a computer 230.

The computer 230 is designed to determine terrain collision risks based on data from the database 210 and the flight parameters.

The warning generator 240 is designed to generate a sound and visual warning if the computer 230 determines a potential risk of collision with the terrain.

It should be noted that this system 20 for signalling terrain collision risks corresponds to the system for signalling terrain collision risks $TAWS_{sol}$ used to validate the terrain database TerrDB. As a variant, the systems are different. For example, the processing capacity of the onboard system 20 is lower than the TAWS $TAWS_{sol}$ on the ground.

Figure 3:
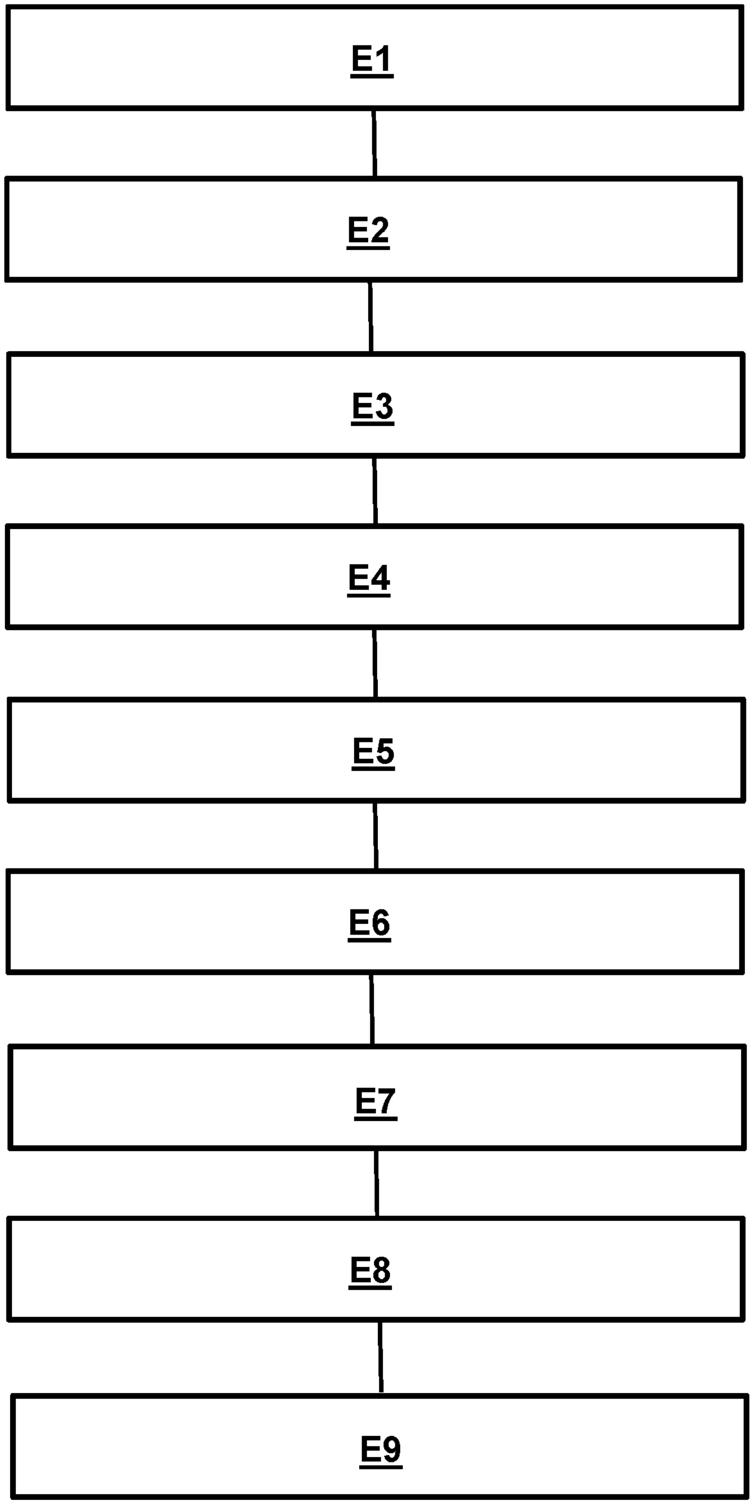
FIG. 3 illustrates the steps of the validating method implemented by the validating device of FIG. 2.

FIG. 3 details the steps of a method for validating a terrain database TerrDB implemented by the validating device 10 of FIG. 2. This method comprises a step E1 of extracting departure $Proc_{dep}$ and arrival procedures associated with geographical regions $Z_G$ covered by the terrain database TerrDB. In a step E2, a set of operational routes Roads is generated based on the extracted departure procedures $Proc_{dep}$ and arrival procedures $Proc_{arr}$. In a step E3, scenarios Sri are generated based on the operational routes Roads. These scenarios are then processed in a step E4 by an FMS to form trajectories $FMS_{traj}$. In a step E5, the trajectories $FMS_{traj}$ are sampled to obtain instantaneous aircraft vectors. The instantaneous aircraft vectors form data on trajectories and speeded-up flight simulations based on said data are produced in a step E6. In a step E7, terrain collision risks Risqs are determined by the system for signalling terrain collision risks $TAWS_{sol}$ based on the speeded-up flight simulations $Sim_{acc}$. In a step E8, the causes of terrain collision risks Risqs are determined to determine whether there is an error in the terrain database TerrDB. Depending on this analysis, a validation OK or non-validation NOK message for this terrain database is transmitted to the control module 170 in a step E9. It will be noted that steps E1 to E8 may be carried out multiple times in multiple successive loops depending on the needs of the analysis of the origins of collision terrain risks Risqs. It will be noted that steps E4, E6 and E7 may be carried out, at least partly, by processing means present in a computing cloud.

Another subject of the invention relates to a computer program product comprising program instructions that are usable by the validating device of FIG. 2 which, when they are executed or interpreted by said validating device, trigger the implementation of the validating method as described with reference to FIG. 3.

The invention thus affords the following advantages:

- it makes it possible to validate the ground-based TAWS $TAWS_{sol}$ coupled to the terrain database TerrDB by using the trajectories $FMS_{traj}$ computed with DAL B over a set of operational routes Roads using the entire global navigation database NavDB.

The ground-based TAWS $TAWS_{sol}$ robustifies with respect to raising alarms needlessly close to airports during takeoff or approach.

The ground-based TAWS $TAWS_{sol}$ detects artefacts before a new terrain database TerrDB is brought into operation.

The ground-based TAWS $TAWS_{sol}$ validates each new terrain database TerrDB or each update to this database in order to ensure the overall quality of the TAWS product.

The FMS validates all of the trajectories calculated in terms of excursion with the aid of the certified external TAWS $TAWS_{sol}$.

The FMS validates new RNP (required navigation performance) procedures according to the FMS reality.

The FMS validates new navigation databases NavDB or each update to this database in order to ensure the overall quality of the TAWS product.

The FMS validates LLF (low-level flight) trajectories.

Longer-term, it is possible to use this validating method for FMS feedback and thereby allow a safe trajectory to be constructed.

The invention claimed is:

1. A method for validating a terrain database comprising a plurality of items of information on at least one geographical region liable to be flown over by an aircraft, said validating method comprising the following steps implemented by computing means:

- extracting from a navigation database departure and arrival procedures associated with the at least one geographical region covered by the terrain database;
- generating operational routes based on the extracted departure and arrival procedures to link the end of a departure procedure to the beginning of an arrival procedure;
- generating a plurality of scenarios based on the operational routes;
- computing by a flight management system a trajectory for each of the plurality of scenarios;
- simulating flights for the plurality of trajectories, said flight simulations being speeded up;
- determining terrain collision risks by means of an on-ground signaling terrain collision risks system for the speeded-up flight simulations;
- determining the origins of terrain collision risks for each determined risk; validating the terrain database if the origin of the terrain collision risk does not originate in the terrain database or correcting the terrain database if the origin of the terrain collision risk originates in the terrain database; and
- transmitting the terrain database to a system for signaling terrain collision risks installed on board an aircraft equipped with a flight management system.

2. The validating method according to claim 1, wherein the plurality of trajectories comprise trajectory data processed in the flight simulations as instantaneous aircraft vectors.

3. The validating method according to claim 2, wherein the instantaneous aircraft vectors are obtained by sampling the plurality of trajectories.

4. The validating method according to claim 3, wherein the plurality of scenarios, are based on at least one parameter belonging to a set of parameters comprising at least:

- a mass of the aircraft;
- a wind strength;
- a climb rate of the aircraft;
- a descent rate of the aircraft;
- a takeoff temperature;
- a landing temperature;
- a cruising speed of the aircraft;
- a cruising altitude of the aircraft.

5. A computer program product comprising instructions causing a computer to perform the steps of a validating method according to claim 1 when said computer program product is executed on said computer.

6. A system for signaling terrain collision risks intended to be installed on board an aircraft, said onboard signaling system being able to warn a crew of said aircraft of a terrain collision risk in a geographical region flown over by said aircraft, said onboard signaling system comprising all or part of a terrain database, said terrain database having been previously validated by the validating method of claim 1.

7. An aircraft comprising an onboard system for signaling terrain collision risks according to claim 6.

8. A device for validating a terrain database comprising a plurality of items of information on at least one geographical region liable to be flown over by an aircraft, said validating device comprising:

- a module for extracting from a navigation database departure and arrival procedures associated with the at least one geographical region covered by the terrain database;
- a route set generator for generating operational routes based on the extracted departure and arrival procedures to link the end of a departure procedure to the beginning of an arrival procedure;
- a scenario generator for generating a plurality of scenarios based on the operational routes;
- a module for computing by a flight management system a trajectory for each of the plurality of scenarios;
- a flight simulator for simulating flights for the plurality of trajectories, said flight simulations being speeded up;

an on-ground system for signaling terrain collision risks to determine terrain collision risks for the speeded-up flight simulations;

a module for determining the origin of terrain collision risks for each determined risk;

a module for validating the terrain database if the origin of the terrain collision risk does not originate in the terrain database or for correcting the terrain database if the origin of the terrain collision risk originates in the terrain database; and a module for transmitting the terrain database to a system for signaling terrain collision risks installed on board an aircraft equipped with a flight management system.

* * * * *